United States Patent [19]
Lin

[11] Patent Number: 5,890,411
[45] Date of Patent: Apr. 6, 1999

[54] POWER TRANSMITTING STRUCTURE FOR A BAND SAW

[76] Inventor: Bin Chun Lin, 17, Ching Wu East Road, East District, Taichung City, Taiwan

[21] Appl. No.: 50,124

[22] Filed: Mar. 30, 1998

[51] Int. Cl.[6] ................................................. B23D 55/06
[52] U.S. Cl. ............................... 83/788; 83/591; 74/325; 74/333
[58] Field of Search ........................... 83/788, 794, 796, 83/814, 591; 74/325, 333

[56] References Cited

U.S. PATENT DOCUMENTS

| | | | |
|---|---|---|---|
| 714,567 | 11/1902 | Edgar | 74/333 |
| 1,654,924 | 1/1928 | Douglas | 74/333 X |
| 1,910,320 | 5/1933 | Bullock | 74/333 |
| 2,684,530 | 7/1954 | Weinberg | 83/814 X |
| 2,830,628 | 4/1958 | Pettigrew et al. | 83/788 |
| 3,908,501 | 9/1975 | Aizawa | 83/788 |
| 4,766,790 | 8/1988 | Harris | 83/796 X |

*Primary Examiner*—Rinaldi I. Rada
*Assistant Examiner*—Ana Luna
*Attorney, Agent, or Firm*—Rosenberg, Klein & Bilker

[57] ABSTRACT

A power transmitting structure for a band saw includes a first and a second shaft, and each of the two shafts has a plurality of gears engaged with each other so as to transmit a power of a motor with several sets of speed options. Each of the gears freely mounted to the second shaft has a notch defined in an inner periphery defining a central hole thereof. The second shaft has a third shaft movably received therein which is controlled by a control member connected to a knob. The third shaft has a pawl member pivotally disposed thereto in the second shaft which has a slot defined through a peripheral wall thereof so that the pawl member is selectably engaged with one of the notches. The second shaft has a toothed portion to engage with a rotating part to which a band saw member is connected.

6 Claims, 5 Drawing Sheets

POWER TRANSMITTING STRUCTURE FOR A BAND SAW

BACKGROUND OF THE INVENTION

1. Field of the Invention

The present invention relates to a power transmitting structure for a band saw and the transmitting structure comprises two shafts each having a plurality of gears mounted thereto and engaged with each other. A first shaft has an actuating rod slidably received therein and a slot defined in a peripheral wall thereof. The actuating rod has an engaging member optionally engaged with one of the gears to complete speed shifting without stopping the band saw.

2. Brief Description of the Prior Art

FIG. 1 shows a conventional band saw whose power transmitting structure generally comprising a bridge member 11 which has a first end having a motor 20 disposed thereto an a second end. The motor 20 has a first shaft 21 which has a first pulley 15 with a plurality of outer diameters. A second shaft 16 disposed parallel to the first shaft 21 has a second pulley 160 with a plurality of outer diameters. A belt 17 reeves through the two pulleys 15, 160. The second shaft 16 has a toothed end 161 which drives a gear 14 which is co-axially connected to a first wheel 13. The bridge member 11 has a second wheel (not shown) disposed thereto so that a band saw member 12 is rotatably connected between the two wheels. Therefore, the power from the motor 20 is transmitted to the two wheels 13 by the engagement of the gear 14 and the toothed end 161. However, the power transmitted by the belt 17 involves an inherent shortcoming which is that when a large torque is applied to the first pulley 15, a slide movement of the belt 17 may occur and such slide movement produces a large noise. Furthermore, when a different speed is required, the band saw must stop completely so as to shift the belt 17 to a different diameter of each pulley 15/160. This takes too much time and reduces working efficiency.

The present invention provides an improved power transmitting structure for a band saw so as to shift the speed of the band saw without stopping the band saw.

SUMMARY OF THE INVENTION

In one aspect of the present invention, there is provided a power transmitting structure for a band saw which comprises a motor indirectly driving a first rotating part, a band saw member rotatably connected between the first rotating part and a second rotating part, the power transmitting structure comprising a first shaft driven by the motor with at least two first gears securely mounted thereto and a second shaft disposed parallel to the first shaft with at least two second gears freely mounted thereto which are respectively engaged with the first gears. Each the second gear has a notch defined in an inner periphery defining a central hole thereof.

The second shaft has a first end and a second end which is an open end, a space defined longitudinally in the second shaft and communicating with the open end. At least one slot is defined through a peripheral wall of the second shaft and the first end of the second shaft has a first toothed portion defined in an outer periphery thereof. The first toothed portion is engaged with the first rotating part.

A third shaft is movably received in the space and has a first end with a pawl member pivotally connected thereto and a second end having a second toothed portion which longitudinally extends beyond the open end of the second shaft. A control member is engaged with the second toothed portion so as to move the third shaft in the second shaft to move the pawl member to engage with one of the notches.

It is an object of the present invention to provide a power transmitting structure for a band saw, which allows a user to change operation speed without stopping the band saw.

It is another object of the present invention to provide a power transmitting structure for a band saw, which is operated by operating a knob on a box into which the power transmitting structure is received.

How these and other objects are accomplished will become apparent from the following descriptions and from the drawings.

DETAILED DESCRIPTION OF THE PREFERRED EMBODIMENT

Figure 1:
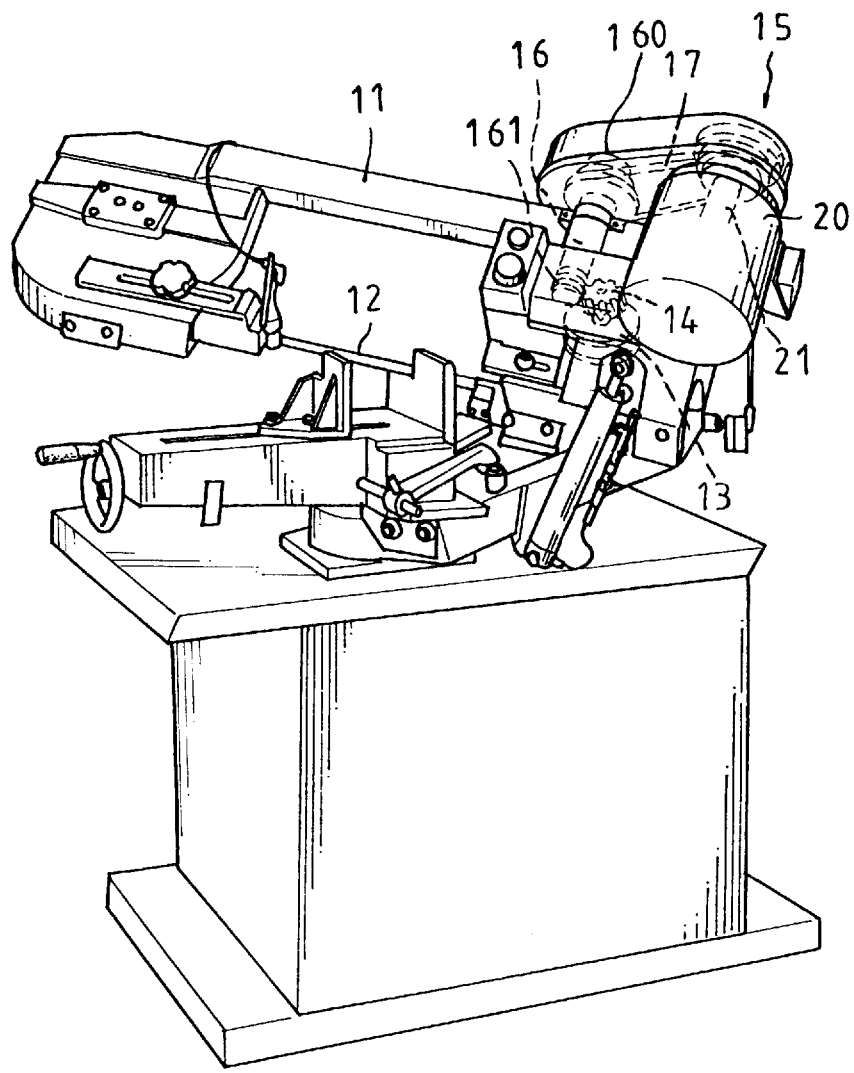
FIG. 1 is a perspective view of a conventional band saw.
Figure 2:
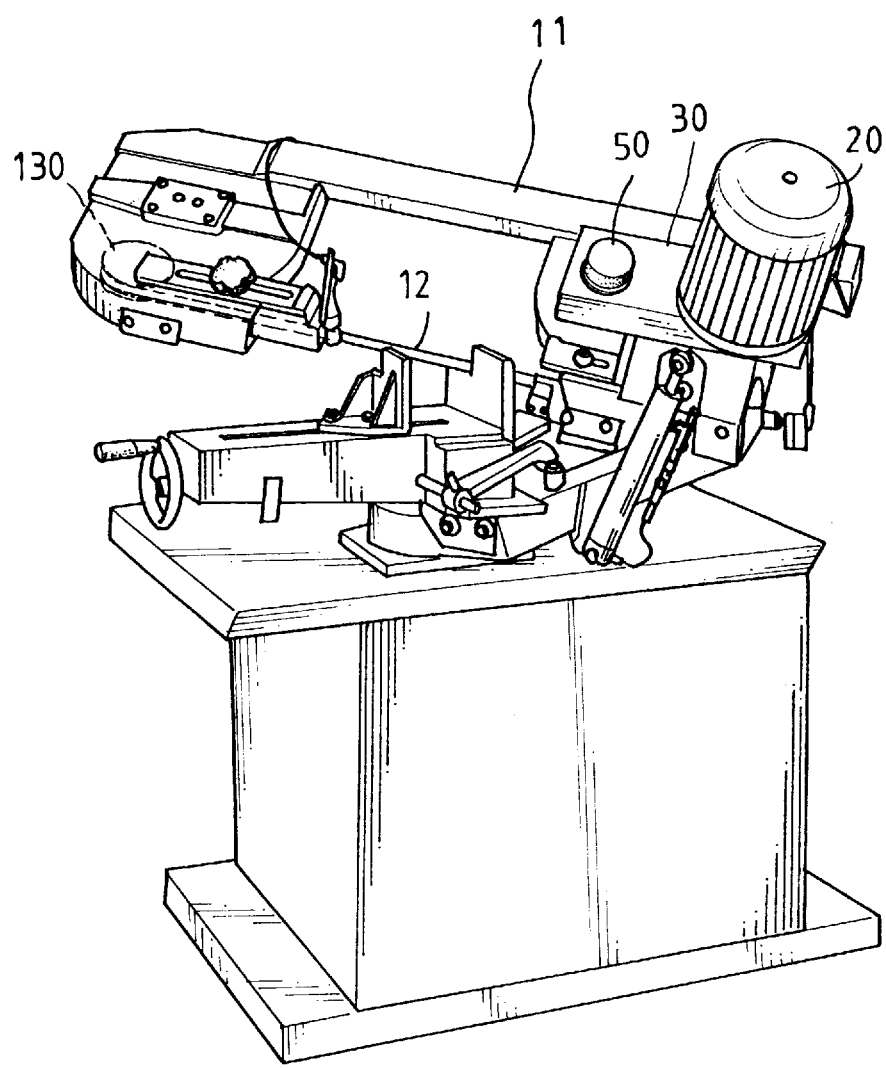
FIG. 2 is a perspective view of a band saw in accordance with the present invention.
Figure 3:
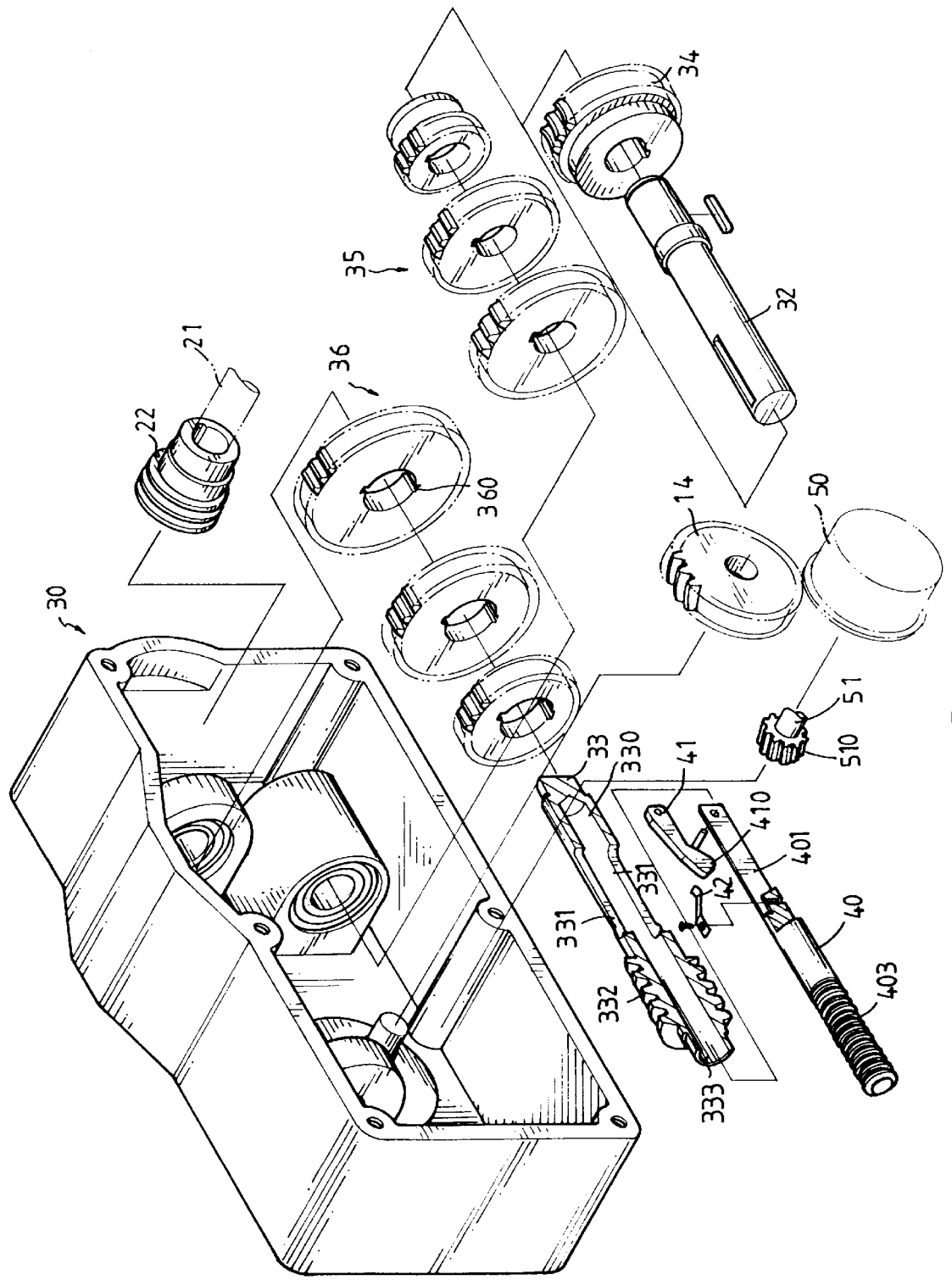
FIG. 3 is an exploded view of a power transmitting structure in accordance with the present invention.
Figure 4:
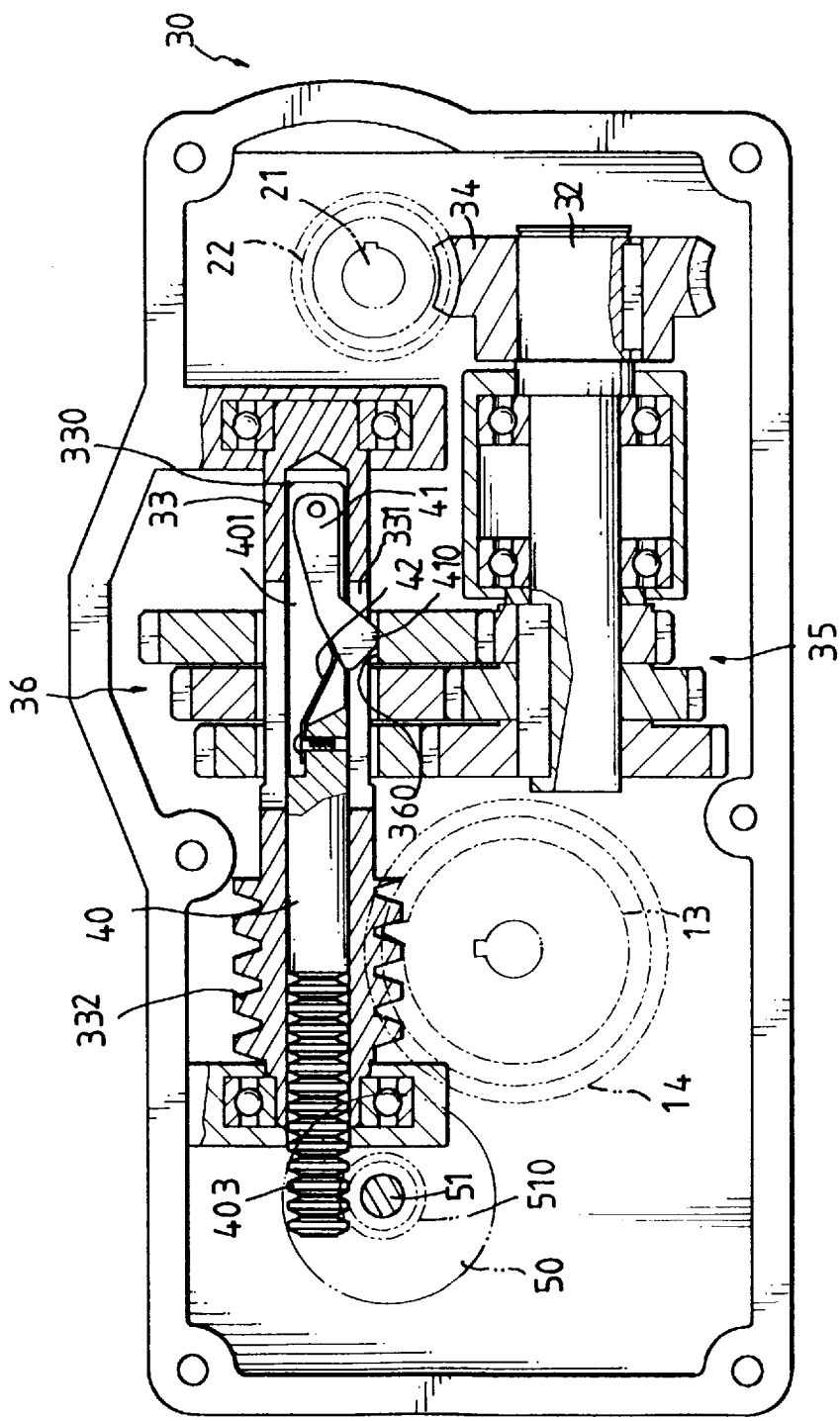
FIG. 4 is a side elevational view, partly in section, of the power transmitting structure of the present invention.

Referring to the drawings and initially to FIGS. 2, 3 and 4, a band saw, as described corresponding to FIG. 1, includes a bridge member 11, a motor 20 disposed to one of two ends of the bridge member 11, a band saw member 12 rotatably connected between a first rotating part 13 and a second rotating part 130. A box 30 is disposed to the bridge member 11 and the motor 20 has a driving shaft 21 extending through the box 30, the driving shaft 21 has a driving gear 22 disposed thereto.

The transmitting structure in accordance with the present invention generally includes a first shaft 32 which has a transmitting gear 34 disposed thereto which is engaged with the driving gear 22. The first shaft 32 has three first gears 35 securely mounted thereto.

A second shaft 33 is rotatably disposed in parallel with the first shaft 32 and has three second gears 36 freely mounted to the second shaft 33 so as to be respectively engaged with the first gears 35. Each of the second gear 36 has a notch 360 defined in an inner periphery defining a central hole thereof. The second shaft 33 has a first end and a second end which is an open end 333, a space 330 defined longitudinally in the second shaft 33 and communicating with the open end 333. At least one slot 331 is defined through a peripheral wall of the second shaft 33 and the second end of the second shaft 33 has a first toothed portion 332 defined in an outer periphery thereof. The first toothed portion 332 is engaged with a gear 14 mounted to the first rotating part 13.

A third shaft 40 is movably received in the space 330 in the second shaft 33 via the open end 333 and has two arms 401 extending longitudinally from a mediate portion thereof with a pawl member 41 pivotally connected between the two arms 401. A second end of the third shaft 40 has a second toothed portion 403 formed thereto which longitudinally extends beyond the open end 333 of the second shaft 33 and is engaged with a control member 510. The control member 510 has a shaft 51 extending laterally therefrom which is connected to a knob 50 disposed to an outer surface of the box 30. Accordingly, when rotating the knob 50, the third shaft 40 is moved with in the second shaft 33 due to the engagement between the control member 510 and the second toothed portion 403.

A biasing member 42 which is a plate is disposed to the mediate portion of the third shaft 40 and contacts the pawl member 41 at one of two ends of the plate so as to press an engaging end 410 of the pawl member 41 to extend through the slot 331 and be received in one of the notches 360 such that when the second shaft 33 is rotated, the pawl member 41 extending through the slot 331 will rotate the second gear 36 with which the pawl member 41 is engaged, and the third shaft 40 is then rotated.

Figure 5:
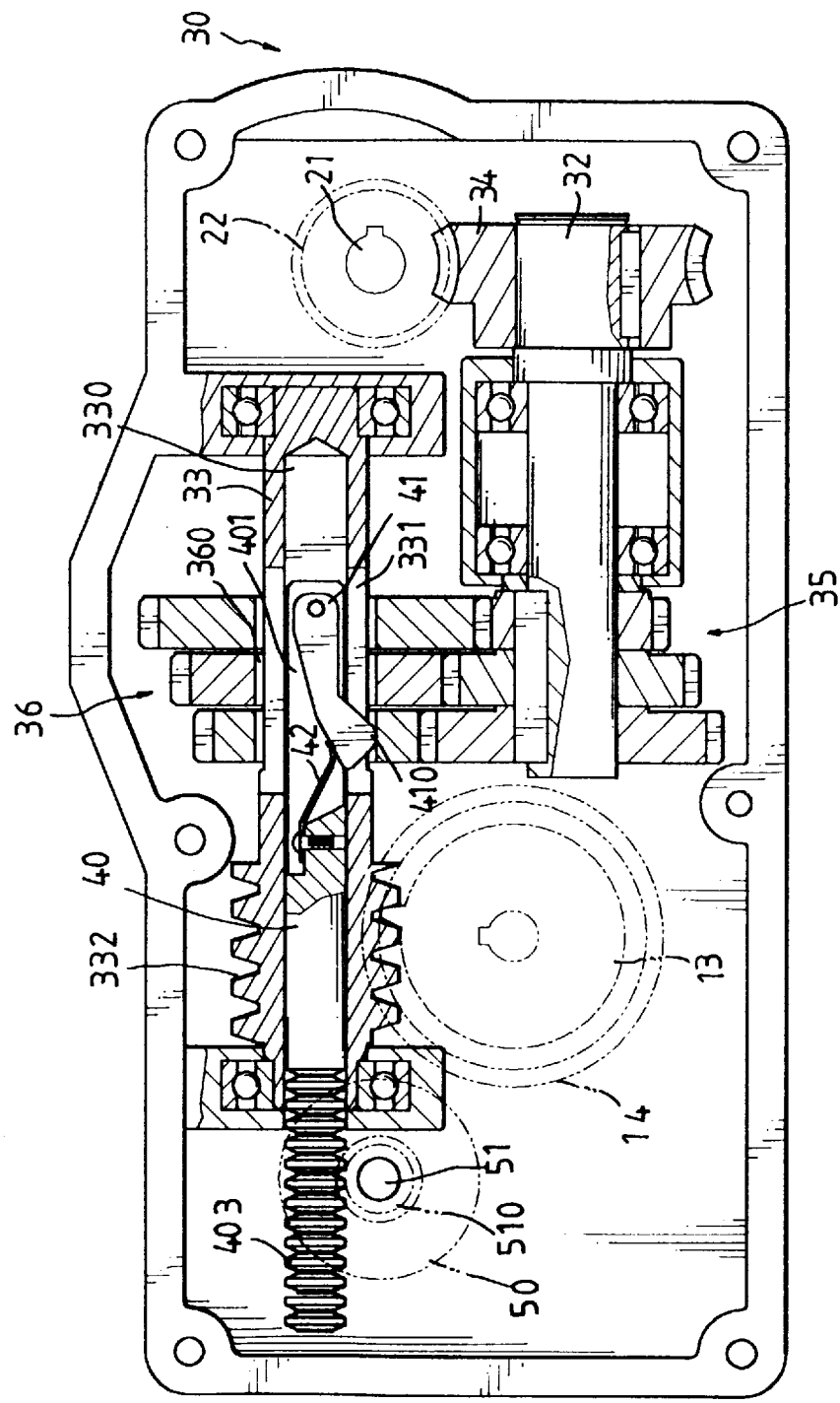
FIG. 5 is a view similar to FIG. 4 showing a third shaft which is moved to change a position of the pawl member so as to engage with another gear.

Therefore, referring to FIG. 5, the operation speed of the band saw can be easily changed by rotating the knob 50 to move a position of the pawl member 41 so as to be selectably received in one of the notches 360 without stopping the band saw. The first rotating part 13 is then rotated by the first toothed portion 332 of the second shaft 33 so as to rotate the band saw member 12.

While particular embodiments of the present invention have been illustrated and described herein, it is not intended to limit the invention and changes and modifications may be made therein within the scope of the invention as hereinafter claimed.

What is claimed is:

1. A power transmitting structure for a band saw which includes a motor indirectly driving a first rotating part, a band saw member rotatably connected between said first rotating part and a second rotating part, said power transmitting structure comprising:

a first shaft adapted to be driven by said motor and at least two first gears securely mounted to said first shaft;

a second shaft rotatably disposed in parallel with said first shaft and at least two second gears freely mounted to said second shaft so as to be respectively engaged with said first gears, each said second gear having a notch defined in an inner periphery defining a central hole thereof, said second shaft having a first end and a second end which is an open end, a space defined longitudinally in said second shaft and communicating with said open end, at least one slot defined through a peripheral wall of said second shaft and said second end of said second shaft having a first toothed portion defined in an outer periphery thereof, said first toothed portion adapted to engage with said first rotating part;

a third shaft movably received in said space in said second shaft via said open end, said third shaft having a first end with a pawl member pivotally connected thereto and a second end having a second toothed portion which longitudinally extends beyond said open end of said second shaft, and a control member engaged with said second toothed portion so as to move said third shaft together with the pawl member in said second shaft such that said pawl member is engaged with one of said notches.

2. The power transmitting structure as claimed in claim 1 further comprising a biasing member disposed to said third shaft and contacting said pawl member so as to press an engaging end of said pawl member to extend through said slot and be received in one of said notches.

3. The power transmitting structure as claimed in claim 2 wherein said biasing member is a plate which has an end fixedly connected to said mediate portion of said third shaft.

4. The power transmitting structure as claimed in claim 1 said third shaft has two arms extending longitudinally from a mediate portion thereof and said pawl member is pivotally connected between said two arms.

5. The power transmitting structure as claimed in claim 1 further comprising a knob connected to said control member.

6. The power transmitting structure as claimed in claim 1 further comprising a box in which said power transmitting structure is received, said knob disposed to an outer surface of said box.

* * * * *